Figure 1:
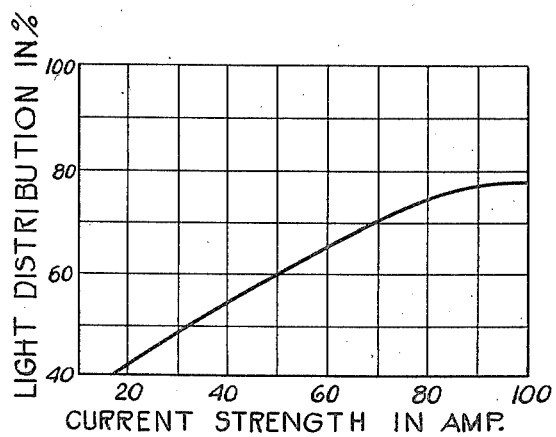

Dec. 31, 1957  H. ULFFERS  2,817,997
OPTICAL ARRANGEMENT FOR PROJECTOR LAMPS
Filed Feb. 7, 1956  3 Sheets-Sheet 1

Inventor
Heinz Ulffers
by Singer, Stern & Carlberg
Attorneys

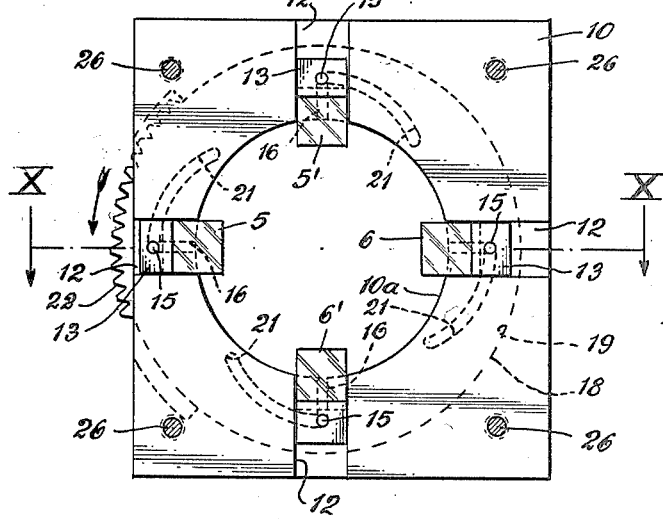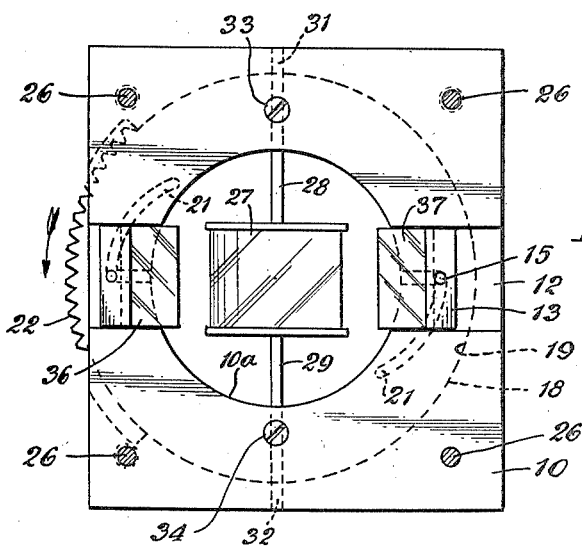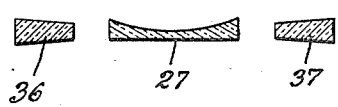

United States Patent Office 2,817,997
Patented Dec. 31, 1957

2,817,997

OPTICAL ARRANGEMENT FOR PROJECTOR LAMPS

Heinz Ulffers, Kiel-Wik, Germany, assignor to Zeiss Ikon A. G. Stuttgart, Stuttgart, Germany Application February 7, 1956, Serial No. 564,055

Claims priority, application Germany February 7, 1955

6 Claims. (Cl. 88—24)

This invention relates generally to optical arrangements for projector arc lamps and more particularly to an optical arrangement to improve the distribution of light emanating from an electric arc.

The more powerful projector light sources are usually carbon electrode arc lamps. These are arranged in the optical system so that the positive crater of the carbon electrode is reflected from a curved mirror, such as an elliptical mirror or the like, through the projector window or opening. Since the light density of the carbon electrode crater diminishes substantially from the center toward the edges and since this condition may even be amplified by the reflecting mirror, the light density in the projector window or opening is not uniform over the area of the opening. Special measures are needed to properly distribute the light over the opening area.

When using arc lamps in projector operation in order to make adjustments for different screen sizes, the operator varies the arc current density. This current density change may cover a range of 30 to 110 amperes. This requires a range of diameters of carbon electrodes of from 6 to 11 millimeters. For economical reasons the reflector mirror is usually never changed. As a result it is difficult in all cases to obtain sufficient amplification of the smaller carbon electrode craters to adequately cover the projector window or opening which is necessary to obtain satisfactory light distribution and output.

Another difficulty with this arrangement resides in the lack of sufficient flexibility to adjust the intensity of the light rays to the light intensity capacity of the projector objective lens system. Further, it is frequently necessary to successively run films of different sizes which requires adjustment of the aforesaid conditions.

Accordingly it is a broad object of this invention to provide an optical arrangement for a projector which is easily adjustable to cover the range of operating conditions providing optimum light output throughout the adjustment range.

Among different ways suggested for obtaining better light distribution, was the substitution of the aspherical mirror for the elliptical mirror. The aspherical mirror has an aberration curve differing in some predetermined manner from that of the elliptical mirror so that the crater images produced by the edge zones are disposed approximately at the edge of the crater image which is produced by the central part of the mirror. This latter image is of approximately circular shape in most cases and is substantially larger than the first mentioned images providing some improvement in light distribution.

However, with the above arrangement the desired light distribution can be obtained for a certain electrode diameter and, hence, crater diameter and a corresponding light density distribution. For this reason the correction is provided in such a manner that the desired uniformity of light distribution is obtained at the upper end of the arc current range. For smaller currents the light distribution is less uniform. Thus additional means are required to correct the condition when the arc current is reduced.

One way to improve the light distribution for smaller arc currents is to move the arc further away from the reflecting mirror. But this method has the practical disadvantage that it requires particularly large projector table plates, which support the arc lamp and its adjusting means, to provide the required range of adjustability between the arc lamp and the projector. Additionally the intensity of the reflected light decreases with increasing displacement from the reflecting mirror.

In a second arrangement, a dissipation lens for increasing the carbon electrode crater image is placed in the light ray path between the reflecting mirror and the projector mirror or opening. This eliminates the need for large adjustment of the arc lamp but requires a number of dissipation lenses of different strengths in order to cover the range of applications. However, since arc lamp adjustment is not completely eliminated some loss in reflected light intensity is again experienced.

A third arrangement provides for movement of the carbon electrode crater closer to the reflecting mirror. The adjustment covers several millimeters. With this scheme the distance between the reflecting mirror and the projector window or opening remains the same for all current densities. This adjustment produces additional abberations tending to improve light distribution. Since the smallest carbon electrode displacement strongly influences the light intensity and light distribution, the adjustment is very critical and difficult to make. The color temperature of the light source is reduced by this adjustment. By way of example, with a 50 ampere arc current a temperature reduction from 6000° K. to approximately 5500° K. was observed.

These arrangements have one common characteristic, namely, a cross section of the light path at any point was approximately or essentially circular. With a rectangular projector window or opening some light loss will occur if the opening is to be covered by the reflected light beam. This was offset to some extent by the use of cylindrical condenser lenses instead of spherical. However, the cylindrical lens distorts the light beam cross section from its circular configuration referred to above to some asymmetrical aperture characteristic of the projector objective lens, which introduces an adjustment difficulty. In all these arrangements the spherical and cylindrical types of condenser lenses are sufficiently large to include the entire cross section of the reflected light beam.

Thus a more specific object of this invention is to provide an optical arrangement for controlling a carbon arc reflected light beam which provides simple arrangements for controlling light distribution over a selected area.

Another object hereof is to provide optical arrangements for controlling a reflected carbon arc light involving optical members which do not cover the light beam cross section.

Stated otherwise, it is an object hereof to provide optical arrangements comprising optical members covering selected areas of the reflected carbon arc light beam to afford selective control of light distribution.

It is also an object hereof to provide easily adjustable mounting means for said optical members of the preceding object wherein a single adjustment of said mounting means moves all said optical members.

With the arrangement generally stated in the foregoing objects, the disadvantages of prior art assemblies are overcome. The use of individual optical members disposed for controllable insertion in varying degree into the reflected carbon arc light beam provides the desired control of light distribution. Still further control is achievable by changing the form of the optical members.

Figure 2:
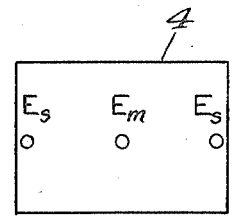
Figure 3:
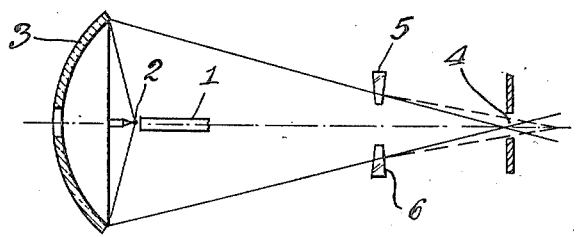
Figure 13:
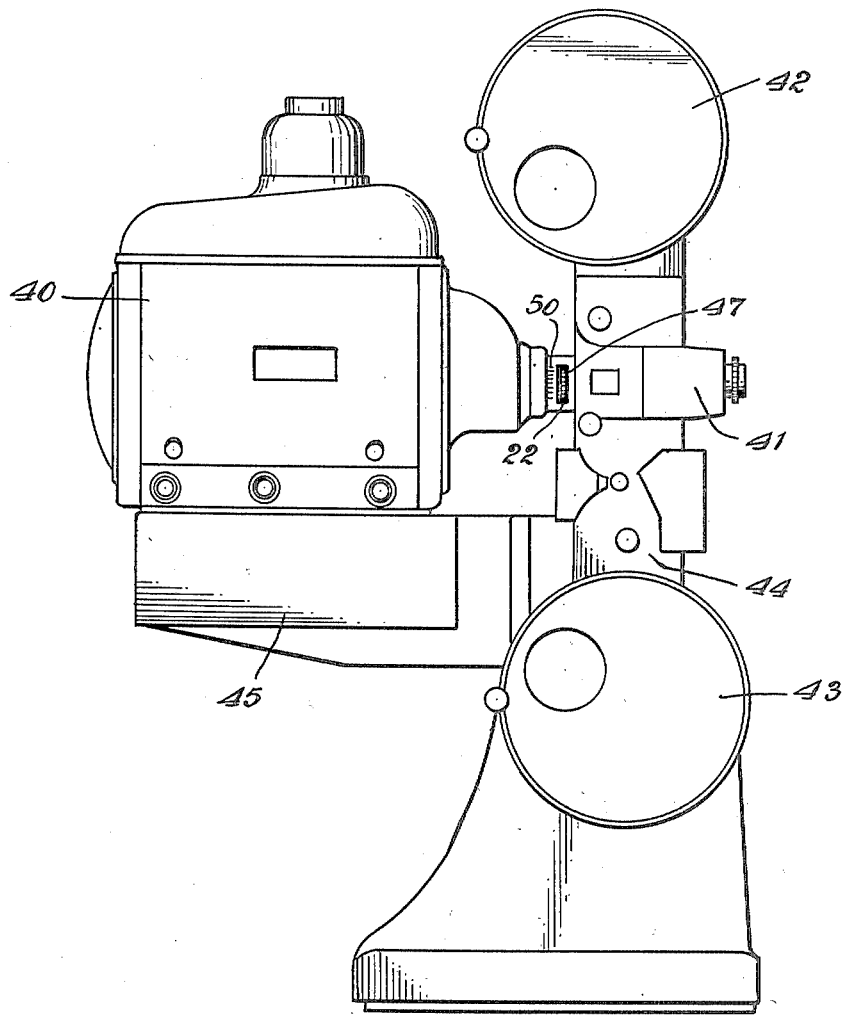

Other objects and advantages will become apparent upon a study of the following disclosure when considered in conjunction with the accompanying drawings, in which:

Figure 1 is a graph plotting light distribution against current strength for one type of prior art carbon arc optical system arrangement, Fig. 2 shows the camera picture window or opening in outline indicating the centers of light intensity for said one type of carbon arc optical system arrangement, Fig. 3 is a schematic view of a carbon arc optical system embodying the principles of this invention, Figs. 4 through 8 show typical light distribution patterns achievable with arrangements embodying the principles of this invention, Fig. 9 is a plan view of a practical arrangement of optical members mounted for simultaneous adjustment, Fig. 10 is a sectional view taken on the line X—X of Fig. 9, Fig. 11 is a modification of the arrangement shown in Fig. 9, Fig. 12 is an edge view of the optical members of Fig. 11, and Fig. 13 is a side view of a motion picture projector showing the location of the optical assembly of this invention.

Fig. 1 shows the light distribution in a projector window or opening for a conventional motion picture camera carbon arc reflector mirror of 356 millimeters (14.01 inches) plotted against arc current. Under light distribution is hereby shown the quotient from the lighting strength at the edge of the image $E_s$ and of the lighting strength in the middle of the picture $E_m$, see Fig. 2, within the boundaries of the picture window 4, shown only in outline in the interest of simplicity. According to standard industrial norms a light distribution of 75% is sufficient. The values shown in Fig. 1 are valid for constant distance between the projector window or opening 4 and the mirror and for adjustment for the highest lighting strength in the picture middle.

This invention provides improvements in the light distribution over that shown in Fig. 1 at the lower levels of arc current with an arrangement as schematically shown in Fig. 3. In this arc lamp assembly the positive carbon electrode is arranged in conventional end-to-end relation with a negative electrode 1a suitably supported substantially centrally of a reflecting mirror 3 having an opening 3a centrally thereof through which the support (not shown) for the negative electrode 1a may pass. The end of the carbon electrode 1 faces mirror 3 and is consumed by the arc 2 struck between it and the negative electrode 1a when arc current is caused to flow.

Light emanating from arc 2 and the glowing creater in the end of electrode 1 is reflected from a concave reflector mirror 3 to the projector window or opening 4. Optical wedges 5 and 6 are disposed between the mirror 3 and the projector window or opening 5. These extend radially inwardly of the reflected light beam, intercepting and deflecting the part of the light beam passing therethrough. Thus the remaining portion of the light beam, particularly the central portion, is not affected by the optical wedges. By this means the light may be more uniformly distributed over the area of the projector window or opening, the distribution being controlled by the depth of penetration of the optical wedges into the light beam.

Figure 4:
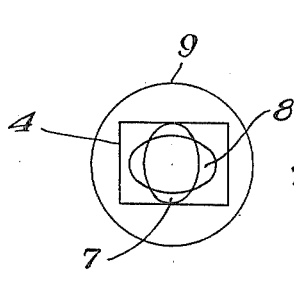
Figure 5:
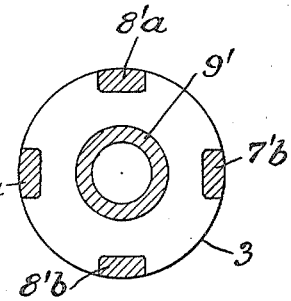
Figure 6:
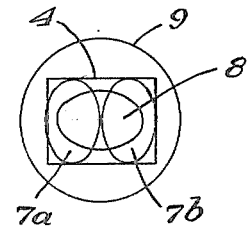

A better understanding of this invention will be had from reference to the light patterns shown in Figs. 4 and 6. In connection with these illustrations it is assumed that an elliptical mirror 3 is employed. In Fig. 4 the images 7, 8 and 9 overlap one another having approximately the same center. To simplify the illustration, only the three images 7, 8 and 9 are shown together with the outline of the projector window or opening 4. These images are reflected from the five shaded areas 7'a, 7'b, 8'a, 8'b and 9' shown on the reflecting surface of mirror 3 in Fig. 5. Since only the central portion of the projector window or opening 4 is covered by all of the elementary images, the light intensity is highest in the central portion and diminishes markedly beyond this area.

Fig. 6 shows a typical light distribution pattern achievable with an optical arrangement such as shown in Fig. 3. Both optical wedges 5 and 6 penetrate the reflected light beam sufficiently to deflect the reflected light, say, from areas 7'a and 7'b so that images 7a and 7b, located approximately as shown in window or opening 4, are formed. By varying the depth of penetration of the optical wedges 5 and 6 into the reflected light beam, it is possible to vary the distribution of the light in the projector window or opening 4. Hence, if the arc current is changed or the mirror is changed for one of a different curvature, within limits of course, the optical wedges can be displaced as required to obtain optimum light distribution. It is now evident that for a given arc lamp assembly, the necessary optical wedge displacement for a given arc current, to achieve optimum light distribution may be marked on a scale to facilitate adjustment of the optical wedges.

Figure 7:
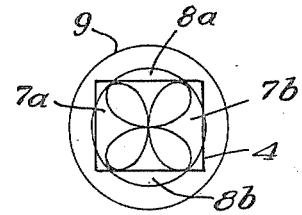

If four optical wedges are arranged in equally circumferentially spaced relation and correspondingly radially positioned to deflect light reflected from all four shaded areas 7'a, 7'b, 8'a and 8'b, shown in Fig. 5, a light distribution pattern of the character shown in Fig. 7 may be obtained. Here the deflecter images 7a, 7b, 8a and 8b are substantially tangent at their marginal edges at the center of image 9 in the projector window or opening 4. It will be noted that better light distribution is obtained with the four optical wedges since the overlapping areas of the respective images cover a larger portion of the projector window or opening 4.

A practical arrangement of the four wedge configuration is shown in Figs. 9 and 10. Here the four optical wedges are arranged in diametrically opposed pairs 5, 6 and 5', 6'. The arrangement comprises an approximately square base plate 10 having a circular central opening 10a. Radially disposed slots 12 in plate 10 open through the inner edges and outer edges of the base plate and slidably receive the blocks 13 in which the optical wedges or prisms are mounted. Each block has a pin 15 projecting from one side thereof into a slot 16 in the base plate which parallels the longitudinal axis of the associated guide slot 12. A ring plate 18 is rotatably fitted in a circular recess 19 in the back face of base plate 10 and is provided with arcuate cam slots 21, the centers of which are correspondingly displaced from the axis of rotation of the ring plate. These slots 21 receive the ends of pins 15 so that rotation of the ring plate 18 by finger force on the protruding knurled or toothed edge 22, correspondingly radially displaces the respective optical wedges or prisms. The assembly is completed by front and back plates 23 and 24, respectively, which are secured to base plate 10 by screws 26. In Fig. 9 the front plate 23 is removed for better illustration of the mounting of the respective optical wedges or prisms.

This invention may be practiced with other than flat sided wedge shaped optical members. For example, sections of cylindrical lenses may be used. These are preferably sections of dissipation lenses so that the deflection of the light beam passing through the respective sections will differ from that described in regard to Fig. 9. This is advantageous in some instances due to the different size and form of the elementary images.

The adjustment of the light beam on the projector window or opening can be further controlled by a combination of the wedges as described with a centrally located stationary optical part, preferably a cylindrical optical lens. This lens is dimensioned so that it covers only a part of the light beam within the inner tips of the optical wedges or prisms. This, it will be appreciated, differs from previous arrangements, which covered substantially all if not all of the light beam.

Fig. 11 shows a practical embodiment of this arrangement. Parts in Fig. 11 corresponding to those of Fig. 10 bear like reference characters. The light intensity of the light beam is not materially changed by the central cylindrical lens since this latter lens deflects only the light rays at the center of the beam within the field of the outer lenses. The central cylindrical lens 27 is carried by two supporting rods 28 and 29. These rods slide in slots 31 and 32 in base 10 and are fastened by respective screws 33 and 34.

Figure 8:
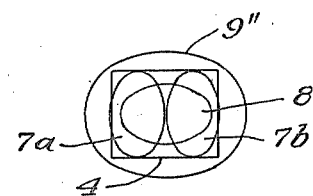

The optical wedges 36 and 37 intercept only the outer portions of the light beam. Fig. 12 is an edge view of the lenses 36, 37 and central lens 27. The position and the form of the elementary images produced by this arrangement are shown in Fig. 8. The cylindrical lens 27 may slightly deform the approximately circular image reflected from area 9' of the reflecting mirror of Fig. 5 to an approximately elliptical shape 9'', the other elementary images 7a, 8a and 8 being approximately the same as described in regard to Fig. 3 and shown in Fig. 6. The deformation of the circular image is so slight however as not to present problems in adjusting the projector lens system.

A projector embodying this invention is shown in outline in side elevation in Fig. 13. The projector comprises a lamp housing 40, a projector objective optic 41 and film reels 42 and 43 which are all mounted on the housing 44. The table 45 which mounts the projector lamp 40 extends rearwardly from housing 44. A slot 47 is provided between the projector lamp 40 and the projector optic 41. This slot is of such size and shape to receive an optical assembly of the type shown in Fig. 9 or 11, with the knurled or toothed edge 22 of ring plate 18 projecting out of slot 47 where it may be conveniently reached and manipulated. A scale 50 adjacent slot 47 calibrated as a function of arc current may indicate required adjustments.

It will be appreciated that the light distribution is greatly improved by the arrangements herein disclosed. The cross sectional configuration of the light beam is not materially changed by the central cylindrical lens 27, since it only tends to displace the light within the light beam. The external configuration of the light beam remains substantially circular and thus the adjustment relative to the projector objective will remain substantially unchanged. Herein is an important advantage of the present invention as compared to cylindrical lens assemblies which cover the entire cross sectional area of the light beam.

The optical arrangements of this invention can be used with conventional optical arrangements such as condenser lenses. Condenser lenses can be used for very high currents and thus larger diameter positive carbon electrodes having correspondingly larger crater diameters, to increase the effective light beam aperture up to the limit of the objective aperture. The optical arrangement of this invention is effective here to improve the light distribution without changing materially the effective aperture of the light beam. Various types of filters may also be employed, including heat protective filters.

As has been confirmed by experiments, the present invention provides other improvements and advantages in addition to improvements in light output. Because of the variety of light distribution patterns which are achievable, even the simplest arrangement, such as shown in Fig. 3, is suitable to replace a series of different lenses. The arc crater is always adjusted for maximum brightness in the mirror. Thus small crater displacements with respect to the mirror are not nearly so noticeable as was the case with prior arrangements. Marked changes in temperature at the arc are also obviated. Further, since only a small part of the light path is covered with the optical wedges, the light losses are smaller than with previous full beam covering lenses. Fine adjustment of the arc lamp does not endanger the wedges from the standpoint of heat damage. Defocusing of the crater which may displace the crater image from the projector window or opening to the condenser lens may even break a hard glass condenser lens due to the highly concentrated heat load. Such damage does not occur when the optical members intercept only the outer portions of the light beam.

While several embodiments of this invention have been herein disclosed, it will be appreciated by those skilled in the art that other modifications of this invention may be made both in its details and in the organization of such details without departing from the spirit and scope hereof. Accordingly, it is intended that the foregoing disclosure and the showings made in the drawings shall be considered only as illustrative of the principles of this invention and are not to be construed in a limiting sense.

I claim:

1. An optical arrangement for a projector lamp assembly comprising, an arc lamp, a reflector disposed to reflect light from said arc lamp as a converging light beam, a projector window in the path of said light beam, optical means disposed between the reflector and the projector window and in the outer circumferential portions of said light beam for deflecting light in said beam outwardly to provide substantially uniform light distribution over the area of said window, means for mounting said optical means in operative alignment in said light beam from said reflector, and adjusting means connected with said optical means for adjusting the radial disposition of said optical means in said light beam to vary the light distribution over said area.

2. An optical arrangement for a projector lamp assembly comprising, an arc lamp, a reflector disposed to reflect light from said arc lamp as a converging light beam, a projector window in the path of said light beam, optical means comprising glass wedges disposed between the reflector and projector window and in the outer circumferential portions of said light beam for deflecting light in said beam, outwardly to provide substantially uniform light distribution over the area of said window, means for mounting said optical means in operative alignment in said light beam from said reflector and adjusting means connected with said glass wedges for adjusting the radial disposition of said glass wedges in said light beam to vary the light distribution over said area.

3. An optical arrangement for a projector lamp assembly comprising, an arc lamp, a reflector disposed to reflect light from said arc lamp as a converging light beam, a projector window in the path of said light beam optical means comprising cylindrical lenses disposed between the reflector and projector window and in the outer circumferential portions of said light beam for deflecting light in said beam outwardly to provide substantially uniform light distribution over the area of said window, means for mounting said optical means in operative alignment in said light beam from said reflector and adjusting means connected with said cylindrical lenses for adjusting the radial disposition of said cylindrical lenses in said light beam to vary the light distribution over said area.

4. An optical arrangement for a projector lamp assembly comprising, an arc lamp, a reflector disposed to reflect light from said arc lamp as a converging light beam, a projector window in the path of said light beam optical means comprising glass wedges disposed between the reflector and projector window and in the outer circumferential portions of said light beam for deflecting light in said beam outwardly to provide substantially uniform light distribution over the area of said window, means for mounting said optical means in operative alignment in said light beam from said reflector, a rotatably mounted ring having cam slots therein, means having radially disposed guide slots therein, mounting means slidably mounting respective glass wedges in said guide slots for movement radially of said light beam, and pins on said mounting means engaging said cam slots whereby rotation of said ring simultaneously radially displaces all said glass wedges in said light beam to vary the light distribution over said area.

5. An optical arrangement for a projector lamp assembly comprising, an arc lamp, a reflector disposed to reflect light from said arc lamp as a converging light beam, a projector window in the path of said light beam optical means comprising glass wedges disposed between the reflector and projector window and in the outer circumferential portions of said light beam for deflecting light in said beam outwardly to provide substantially uniform light distribution over the area of said window, means for mounting said optical means in operative alignment in said light beam from said reflector, adjusting means connected with said glass wedges for adjusting the radial disposition of said glass wedges in said light beam to vary the light distribution over said area, and lens means of lesser area than the cross sectional area of said light beam disposed substantially centrally of said light beam.

6. An optical arrangement for a projector lamp assembly comprising, an arc lamp, a reflector disposed to reflect light from said arc lamp as a converging light beam, a projector window in the path of said light beam optical means comprising cylindrical lenses disposed between the reflector and projector window and in the outer circumferential portions of said light beam for deflecting light in said beam outwardly to provide substantially uniform light distribution over the area of said window, means for mounting said optical means in operative alignment in said light beam from said reflector, adjusting means connected with said cylindrical lenses for adjusting the radial disposition of said cylindrical lenses in said light beam to vary the light distribution over said area, and a cylindrical lens of lesser area than the cross sectional area of said light beam disposed substantially centrally of said light beam.

References Cited in the file of this patent

UNITED STATES PATENTS

| | | |
|---|---|---|
| 1,530,621 | Ritter | Mar. 24, 1925 |
| 2,496,675 | Pasquet | Feb. 7, 1950 |

FOREIGN PATENTS

| | | |
|---|---|---|
| 370,991 | Germany | Mar. 9, 1923 |
| 610,580 | France | June 12, 1926 |
| 408,406 | Great Britain | Apr. 12, 1934 |
| 213,947 | Switzerland | June 16, 1941 |